United States Patent
Aginsky et al.

(10) Patent No.: US 9,916,753 B2
(45) Date of Patent: Mar. 13, 2018

(54) SYSTEMS AND METHODS FOR REMOTE CONTROL ADAPTIVE CONFIGURATION

(71) Applicant: CSR Technology Inc., San Jose, CA (US)

(72) Inventors: Vladislav Aginsky, Kiryat Yam (IL); Dani Shaket, Nesher (IL)

(73) Assignee: CSR Technology Inc., San Jose, CA (US)

( * ) Notice: Subject to any disclaimer, the term of this patent is extended or adjusted under 35 U.S.C. 154(b) by 190 days.

(21) Appl. No.: 14/601,121

(22) Filed: Jan. 20, 2015

(65) Prior Publication Data

US 2015/0130596 A1 May 14, 2015

Related U.S. Application Data

(62) Division of application No. 13/194,307, filed on Jul. 29, 2011, now Pat. No. 8,995,981.

(60) Provisional application No. 61/482,361, filed on May 4, 2011, provisional application No. 61/422,537, filed on Dec. 13, 2010.

(51) Int. Cl.
*G08B 21/00* (2006.01)
*G08C 17/02* (2006.01)
*H04M 1/725* (2006.01)
*H04W 4/00* (2018.01)
*H04W 4/02* (2018.01)

(52) U.S. Cl.
CPC ........ *G08C 17/02* (2013.01); *H04M 1/72533* (2013.01); *H04W 4/008* (2013.01); *H04W 4/023* (2013.01); *H04M 1/72563* (2013.01)

(58) Field of Classification Search
CPC ...................................................... G08C 17/02

USPC ....................................................... 340/12.22
See application file for complete search history.

(56) References Cited

U.S. PATENT DOCUMENTS

| 4,623,887 A | 11/1986 | Welles, II |
| 4,959,810 A | 9/1990 | Darbee et al. |
| 5,614,906 A | 3/1997 | Hayes et al. |

(Continued)

OTHER PUBLICATIONS

BD Touch, Copyright 2011 BD Touch, LLC, http://www.bdtouch.com Jun. 3, 2011, pp. 2.

(Continued)

*Primary Examiner* — Mark Rushing
(74) *Attorney, Agent, or Firm* — Procopio, Cory, Hargreaves & Savitch LLP

(57) ABSTRACT

The present disclosure is directed to systems and methods in which a controllable device transfers to the remote device, such as to a remote control application ("app") located on a smartphone, a data structure identifying various functions that can be controlled by a remote device, together with the identity of the signal type that will achieve the desired operation. The remote device, upon accepting input directly from the remote device, can then allow the remote device user to select how controls of the various functions are to be configured and presented to, or otherwise selectively arranged for a user on a user interface of the remote device. In this way, the present disclosure provides a single highly customizable system. Distributors, resellers, and/or manufacturers of various electronic devices will be able utilize the same controllable device instructions, yet visually distinguish its brand name from other solutions using the same instructions.

21 Claims, 7 Drawing Sheets

(56) References Cited

U.S. PATENT DOCUMENTS

| | | | | |
|---|---|---|---|---|
| 5,949,351 A * | 9/1999 | Hahm | ............... | G08C 23/04 340/12.55 |
| 6,225,938 B1 | 5/2001 | Hayes et al. | | |
| 6,344,861 B1 | 2/2002 | Naughton et al. | | |
| 6,407,779 B1 | 6/2002 | Herz | | |
| 7,064,675 B2 * | 6/2006 | Zigmond | ............... | G08C 17/02 340/12.51 |
| 7,111,320 B1 * | 9/2006 | Novak | ............... | G08C 17/02 348/734 |
| 7,155,305 B2 | 12/2006 | Hayes et al. | | |
| 7,218,243 B2 | 5/2007 | Hayes et al. | | |
| 7,647,610 B2 * | 1/2010 | Kim | ............... | G08C 17/02 725/34 |
| 7,769,370 B2 * | 8/2010 | Du Breuil | ............... | G08C 17/02 455/41.1 |
| 7,895,535 B2 | 2/2011 | Carlson et al. | | |
| 8,006,002 B2 | 8/2011 | Kalayjian et al. | | |
| 8,321,913 B2 * | 11/2012 | Turnbull | ............... | H04L 63/0492 726/2 |
| 8,373,805 B2 * | 2/2013 | Carlsgaard | ............... | H04N 5/4403 348/734 |
| 8,508,148 B1 * | 8/2013 | Carley | ............... | H01R 33/94 200/51.02 |
| 9,252,848 B2 * | 2/2016 | Hale | ............... | G08C 17/02 |
| 2003/0103088 A1 | 6/2003 | Dresti et al. | | |
| 2004/0249925 A1 | 12/2004 | Jeon et al. | | |
| 2005/0122649 A1 * | 6/2005 | Yamamoto | ............... | G08C 17/02 361/62 |
| 2005/0159823 A1 * | 7/2005 | Hayes | ............... | G05B 15/02 700/19 |
| 2006/0148518 A1 | 7/2006 | Ferris | | |
| 2006/0150120 A1 | 7/2006 | Dresti et al. | | |
| 2007/0080823 A1 * | 4/2007 | Fu | ............... | G08C 23/04 340/4.3 |
| 2008/0165024 A1 | 7/2008 | Gretton et al. | | |
| 2008/0174449 A1 * | 7/2008 | Schmidt | ............... | G08C 17/00 340/4.3 |
| 2009/0156251 A1 | 6/2009 | Cannistraro et al. | | |
| 2009/0195349 A1 | 8/2009 | Frader-Thompson et al. | | |
| 2009/0239587 A1 | 9/2009 | Negron et al. | | |
| 2009/0298535 A1 | 12/2009 | Klein et al. | | |
| 2010/0017736 A1 | 1/2010 | Kim | | |
| 2010/0134240 A1 | 6/2010 | Sims et al. | | |
| 2010/0313169 A1 | 12/2010 | Huang et al. | | |
| 2010/0321201 A1 | 12/2010 | Huang et al. | | |
| 2010/0325565 A1 | 12/2010 | Skinner et al. | | |
| 2010/0328547 A1 * | 12/2010 | Mayorga | ............... | G06F 13/385 348/734 |
| 2011/0063506 A1 | 3/2011 | Reams | | |
| 2012/0115503 A1 * | 5/2012 | Lynch | ............... | H04L 67/16 455/456.1 |
| 2012/0146918 A1 | 6/2012 | Kreiner et al. | | |

OTHER PUBLICATIONS

XBMC Remote, XBMC Media Center, XBMC Remote::Manual 1.0, pp. 1-12.

XBMC Architecture Overview, Telematics Freedom Foundation, Written by Trent Nelson, Creative-Commons BY-SA 3.0, www.freedombox.tv, pp. 1-6.

Univeral Remote Control in Smart Phone, The University of Hong Kong, Department of Computer Science, Year 2009-2010 Semester 1, Project takers: Cheng Wing Hong, Cheung Lok Kan, Sit Cheong Tik, Supervisor: Dr. Vincent Lau, pp. 1-16.

"Turn Your Smartphone Into a Home Theater Remote Control," by Loyd Case, Mar. 14, 2010, http;//www.pcworld.com/printable/article/id,214423/printable.html Mar. 23, 2011, pp. 1-18.

* cited by examiner

REMOTE DEVICE MEMORY/STORAGE

115 / 115'
CONTROLLABLE DEVICE 101-1

| FUNCTION 111-1 | SIGNAL 112-1 | STATUS 113-1 | CONFIGURATION 114-1 |
|---|---|---|---|
| ON - OFF | XY1 | ON | BUTTON - RIGHT SIDE |
| MENU | XY2 | ON | BUTTON - CENTER |
| VOLUME | XX1 | ON | UP - RIGHT BOTTOM |
|  |  | ON | DOWN - LEFT BOTTOM |
| CHANNEL | ZZZ | ON | BUTTON - CENTER BOTTOM |
| INPUT | XY3 | OFF | - |

116 / 116'
CONTROLLABLE DEVICE 101-2

| FUNCTION 111-2 | SIGNAL 112-2 | STATUS 113-2 | CONFIGURATION 114-2 |
|---|---|---|---|
| ON - OFF | XX3 | ON | RIGHT SIDE |
| VOLUME | XY5 | ON | UP - DOWN - TOP |
| START | AB1 | ON | GREEN LIGHT |
| STOP | AB2 | ON | RED LIGHT |
| FAST FORWARD | AB3 | ON | ARROW - RIGHT |
| FAST REWIND | AB4 | ON | ARROW - LEFT |
| PAUSE | AB5 | ON | BARS - BOTTOM |
| RECORD | XY6 | ON | BUTTON RED |

| CONTROLLABLE DEVICE MEMORY/STORAGE ||| 103-1 |
|---|---|---|---|
| REMOTE DEVICE 107-1 = NAME : MASTER |||  |
| FUNCTION 119-1 | STATUS 120-1 | RULES 121-1 |  |
| ON - OFF | YES | UNLIMITED |  |
| VOLUME | YES | UNLIMITED | 117 |
| MENU | YES | - |  |
| CHANNEL | YES | ALL |  |
| INPUT | NO | - |  |

| REMOTE DEVICE 107-2 = NAME : CHILD 1 ||| |
|---|---|---|---|
| FUNCTION 119-2 | STATUS 120-2 | RULES 121-2 | |
| ON - OFF | YES | NOT AFTER MIDNIGHT | |
| VOLUME | YES | OFF AFTER 9PM | |
| MENU | NO | - | 118 |
| CHANNEL | YES | NOTHING ABOVE 100<br>NO PREMIUM<br>NO PAY-PER-VIEW | |
| INPUT | NO | - | |

*FIG. 1C*

SYSTEMS AND METHODS FOR REMOTE CONTROL ADAPTIVE CONFIGURATION

CROSS-REFERENCE TO RELATED APPLICATIONS

The present application is a division of U.S. patent application Ser. No. 13/194,307, filed Jul. 29, 2011 and entitled "SYSTEMS AND METHODS FOR REMOTE CONTROL ADAPTIVE CONFIGURATION," which claims the benefit of U.S. Provisional Application No. 61/482,361, filed May 4, 2011 and entitled, "ADAPTIVE METHOD OF CONFIGURING REMOTE CONTROL IP APPLICATION," and U.S. Provisional Application No. 61/422,537, filed Dec. 13, 2010 and entitled, "ADAPTIVE METHOD OF CONFIGURING REMOTE CONTROL IP APPLICATION" the disclosures of which are incorporated herein by reference in their entirety.

BACKGROUND

It is known that a user can control certain functions of an electronic device, for example, the volume of a television or the record setting on a DVR, using a remote device (sometimes referred to as a "clicker," or simply a "remote control"). Such a remote device may be programmed to control several different electronic devices, or different types of specific electronic devices (i.e., one "universal" remote can be programmed to control various brands of televisions).

One known method of programming a remote device requires a user to select a button having a defined function and then select from a menu or list of codes related to the brand of electronic device to be controlled. Once the selection is made, the button will control a corresponding function of the electronic device. For example, assume a user desires to control the volume of a Sony TV. From the remote device, a user operates the button pre-defined as a volume-control button. The user is prompted to select or set a code corresponding to Sony TV's. If the selected code is proper for a Sony TV, the volume button on the remote device is "programmed" to control the volume of the Sony TV.

Another programming method allows a user to copy, into a clone remote device, programming signals from a source remote. Based on the copied information, the clone remote device can control an electronic device (e.g., the volume of a Sony TV) just like the source remote.

Such prior art programming methods for remotes are not sufficiently flexible nor customizable to meet the specific needs of users. For example, it would be difficult, if not impossible, to use prior art programming methods to configure a remote in one way for one user (for example, with the pause button on the top of the device), and the same remote configured another way for another user (for example, with the pause button on the bottom of the device).

A further issue is that manufacturers of different controllable electronic devices have proprietary internal structures that accept signals from remote devices and then convert the received signals into specific actions. The various functions that are performed for different devices vary from device to device and different devices use different data structures to achieve their operations.

Also known are "smart" devices, such as iPhones, iPads and the like, having applications thereon that enable the smart device to remotely control one or more specific electronic devices. Since the electronic devices to be controlled typically have unique signal control instructions, the smart device must be programmed in the manner described above, or alternatively, a set of control instructions must be download. Such control instructions may be downloaded from a common store or website compatible with the smart device. Thus, if a user desires his or her smart device to remotely control three different electronic devices, the control instructions for each of the three controlled electronic devices must be delivered individually from a remote location. This is inefficient, impossible where there is no Internet connection, and may be costly due to downloading fees.

Going on-line to acquire programming information for smart device remote control applications is also problematic in some situations because it requires each manufacturer to make public its signal control sets and to do so in versions that interface properly with the latest hardware/software version of each smart device. This can become a most difficult task to manage and may require a sophisticated tracking network to maintain over a period of time.

BRIEF SUMMARY

Disclosed herein is a system and method for remote control adaptive configuration. According to one aspect of the present invention, a controllable device (controlled device) is responsible for specifying functions available for control by a remote device (controlling device), while the remote device is responsible for creating a graphical representation and applying visual effects that will be presented to a user at the remote device exercising such control. In this way, the present disclosure provides a single highly customizable common system. A distributors, reseller, and/or manufacturer of various electronic devices, such as DVD players, automobiles, Bluetooth headsets, etc., will be able utilize the same controllable device function specification, yet visually distinguish its brand name from other solutions using the same specification.

In one embodiment, a controllable device transfers to a remote device, such as to a remote control application ("app") located on a SmartPhone, a data structure identifying various functions that can be controlled by a remote device, together with the identity of the signal type that will achieve the desired operation. The remote device, upon accepting input directly from the remote device, can then allow the remote device user to select how controls of the various functions are to be configured and presented to, or otherwise selectively arranged for a user on a user interface of the remote device.

In one embodiment, the data structure transferred is relatively small, so that transfer occurs quickly and may be repeated periodically, such as at each new session between the remote device and the controllable device. Small data files also enable the remote device to store many different data structures so as to accommodate protocols for different remote devices and users. This, in turn, allows different users to have control functions unique to the user and/or unique to the remote device type. The small file size also leaves room to store data that will heighten security. One such security function could be that the controllable device's data structure stored on the remote device is renewed during each session, such that if it had been hacked or changed in any manner, the new data structure would replace the changed data structure and the protocols established for the remote device would be maintained.

In one embodiment, all the controllable devices at a location that can be controlled by a particular remote device can be displayed to a user of the remote device. Controllable devices can range from TVs and DVRs to printers, computers, and cameras, or even kitchen appliances or automobiles.

In some embodiments, the controllable device and/or remote device can be password protected such that unknown or unwanted users cannot access the controllable device and/or remote device, change protocols without an owner's permission, or a user can be recognized facilitating delivery of the proper data structure to the remote device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1B shows one embodiment of a portion of memory of a remote device that has been "programmed" with the data structure from two controllable devices in accordance with the present invention;

FIG. 1C shows one embodiment of a portion of a data structure for controlling a controllable device in accordance with the present invention;

DETAILED DESCRIPTION

According to one aspect of the present invention, a controllable device (controlled device) is responsible for specifying functions (providing limited instructions) for control by a remote device (controlling device or controller), while the remote device is responsible for creating a graphical representation and applying visual (or other sensory) effects that will be presented to a user at the remote device exercising control. In this way, the present invention provides a highly customizable system by which distributors, resellers, and manufacturers of various electronic devices will be able utilize the same controllable device instructions, yet visually distinguish its brand name from other solutions using the same instructions.

Figure 1A:
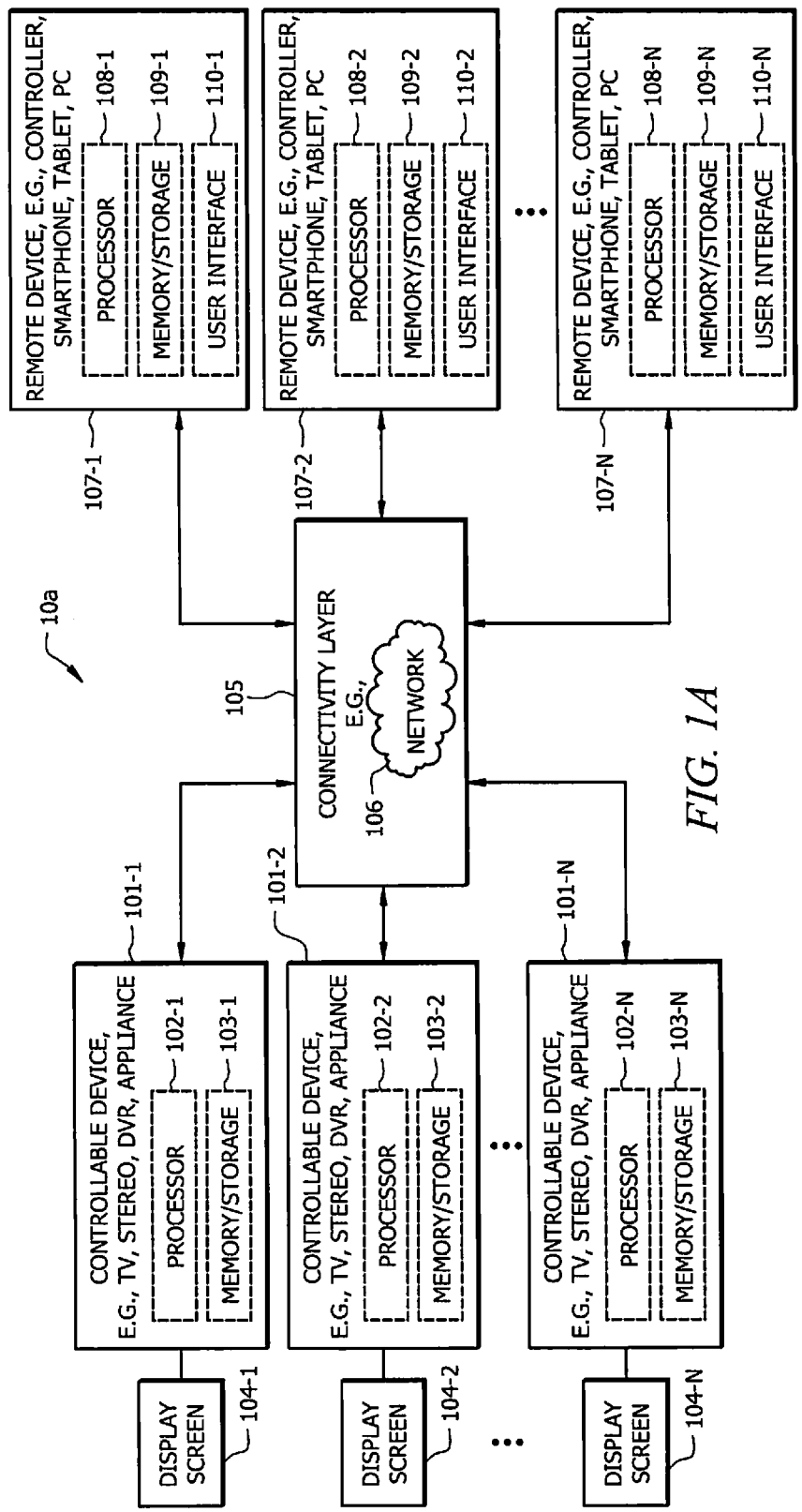
FIG. 1A shows one embodiment of a system utilizing the concepts discussed herein.

FIG. 1A shows one embodiment of a system, such as embodiment 10a, that utilizes the concepts discussed herein. In the embodiment shown, one or more controllable devices, 101-1 to 101-N, are capable of being paired with one or more remote devices, 107-1 to 107-N, via connectivity layer 105, such that a remote device may be used to control specific operations and functions of the controllable device during a paired session. Controllable functions vary with the controllable device and can be related to any operation of the controllable device. Exemplary functions to control of a TV include on/off, channel, and volume; of a DVR include play, fast-forward, and record; of a coffee maker include on/off and brew. Additional exemplary functions are described with reference to FIGS. 1B and 1C, and at FUNCTION columns 111-1, 111-2, 119-1, and 119-2 of same.

Controllable devices 101-1 to 101-N may be any one or combination of various types of processor-controlled programmable electronic devices, including, for example, set-top boxes, cable boxes, televisions, digital video recorders, cameras, printers, small and large appliances, and vehicles. Each controllable device 101-1 to 101-N has a processor 102-1 to 102-N, respectively, memory/storage 103-1 to 103-N, respectively, and optionally, a display screen (or other user interface) 104-1 to 104-N, respectively. Processors 102-1 to 102-N may include circuitry and/or other components (e.g., wireless transmitter, wireless receiver, multiplexors, demultiplexors, etc.) as is well-known in the art for executing various logical operations (i.e., based on computer logic, code, software, applications, firmware, etc.) of controllable devices 101-1 to 101-N (e.g., delivering a data structure of a controllable device to a remote device, sending feedback to a remote device, accepting and parsing command signals from a remote device, manipulating a display in accordance with received command signals, executing authorization/handshake routines, managing and allocating system resources, selecting data transmission channels, connecting to a data transmission network, and more as discussed further below). Memory/storage 103-1 to 103-N may include a variety of types of tangible mediums for storing such logic, code, software, applications, and/or firmware, including, for example, hard drive media, optical media, RAM, EPROM, EEPROM, cartridge media, flash memory, ROM, and/or memory stick.

Connectivity layer 105 may include, for example, network 106 and/or one or more of various types of communication and/or data transmission systems and protocols, such as Bluetooth® short-range wireless connection, Wi-Fi, Internet, phone/data networks (e.g., 3G, 4G, Long Term Evolution (LTE), Unlicensed Mobile Access technology (UMA)), or a light-modulated system. Hence, the data transfer between controllable devices 101-1 to 101-N and 107-1 to 107-N may include multiple networks. The type of connectivity layer 105 (and number of networks involved) will depend on various factors that may include functionality of controllable devices 101-1 to 101-N and remote devices 107-1 to 107-N, the location of controllable devices 101-1 to 101-N and remote devices 107-1 to 107-N, the proximity of controllable devices 101-1 to 101-N to remote devices 107-1 to 107-N, the power of such devices, the availability of certain networks, and capacity for memory/storage 103-1 to 103-N and 109-1 to 109-N at such devices. In some situations, connectivity layer 105 between controllable devices 101-1 to 101-N and remote device 107-1 to 107-N may be wired, in whole or in part. The only requirement for connectivity layer 105 is that both controllable devices 101-1 to 101-N (or a proxy working in conjunction with the controllable device) and remote devices 107-1 to 107-N be capable of establishing a communication path between or among them so as to facilitate an exchange of data.

In the embodiment shown, controllable devices 101-1 to 101-N have stored in memory/storage 103-1 to 103-N, respectively, data structures that are available for communication to one or more remote devices 107-1 to 107-N. The data structures may be factory loaded (i.e., at the time of manufacture of controllable devices 101-1 to 101-N) or later downloaded by a reseller or user to the controllable device. Further, data structures may be updated or modified (manually by a user or automatically) from time to time. For example, a device may acquire a new function—the data structure would be updated to identify the new function and its associated command signal. Such data structures may be received, for example, via connectivity layer 105 if designed to extend into the world outside system 10a, e.g., where network 106 is the Internet and/or a global communication pathway. Otherwise, data structures may be received through a wired or wireless connection separate from connectivity layer 105, and/or by whatever means are used to upgrade/modify software or firmware of controllable devices 101-1 to 101-N during the normal course of operation of such devices.

The data structures stored in controllable devices 101-1 to 101-N may be generic or specific. A data structure may be generic so as to be compatible with more than one remote device or more than one type of remote device 107-1 to 107-N. Alternatively, data structures may be tailored to optimize their delivery to, compatibility with, or use by a specific brand, model, or category of remote devices 107-1 to 107-N, for example, remote devices running a Google operating system or Apple operating system.

Because, in a typical embodiment, the data structure is small (taking up little memory or memory/storage 103-1 to 103-N), several data structures may be stored at the controllable device. When a particular remote device has been paired to a particular controllable device, e.g., controllable devices 101-1 to 101-N, that controllable device is thus able to store, under control of processor 102-1 to 102-N, supplemental data structures unique to and compatible with each historically and/or currently paired remote device 107-1 to 107-N. A single paired remote device may also be associated with multiple data structures stored on a particular controllable device. Further, one or more data structures may be associated with a particular user, e.g., either by virtue of his or her use or ownership of a particular remote device, protocols established by a user, or use of a particular ID/password or other credential indicating compatibility. Therefore, a controllable device, such as controllable device 101-1, may store a plurality of data structures, generic to all paired users and/or remote devices, specific to a remote device, and/or specific to a user.

FIG. 1A also illustrates remote devices 107-1 to 107-N. These may be, for example, a smart clicker, smartphone, tablet computer, personal computer, or any other programmable processor-based device. Such remote devices include a processor 108-1 to 108-N, memory/storage 109-1 to 109-N, and user interface 110-1 to 110-N. Processors 108-1 to 108-N may include circuitry and/or other components (e.g., wireless transmitter, wireless receiver, multiplexors, demultiplexors, etc.) as is well-known in the art for executing various logical operations (i.e., logic, code, software, applications, firmware) of remote devices 107-1 to 107-N (e.g., sending command signals to controllable devices, allowing a user to establish an ID and password, sniffing for controllable devices, verifying compatibility with a controllable device, disconnecting from a controllable device, accepting and parsing data structures of a paired controllable device, managing and allocating system resources, selecting data transmission channels, connecting to a data transmission network, and more as discussed further below). Memory/storage 109-1 to 109-N may include a variety of types of tangible mediums for storing such logic, code, software, applications, and/or firmware, including, for example, a hard drive media, optical media, RAM, EPROM, EEPROM, cartridge media, flash memory, ROM, and/or memory stick. Remote devices 107-1 to 107-N also include user interfaces 110-1 to 110-N that allow a user to control operation of a paired controllable device by various methods, including buttons (via touch screen or mechanical), voice, and motion.

A user of system according to the present disclosure, such as system 10a described in FIG. 1A, may establish protocols or rules customized for a specific remote device or for a specific user. Protocols or rules may apply to all functions or selected functions. Such protocols or rules may define, for example, what remote devices are recognized and/or authorized to control the controllable device (e.g., based on a Media Access Control Address ("MAC address"), phone number, any other unique network or device identification, or user entered ID/password); how function controls (for inputting commands) are presented at a user interface (e.g., CONFIGURATION columns 114-1 and 114-2 of FIG. 1B); whether a remote device is permitted to change protocols or rules; which of the stored data structures is delivered to a remote device; when a data structure is delivered to a remote device (e.g., after a certain function (on/off), after a set period of time, or upon initiation of a new paired session); and other permissions and limitations that a user may desire (e.g., rules limiting accessible TV channels such as shown in RULES columns 121-1 and 121-2 of FIG. 1C).

One such protocol may require an ID, password, and/or other credentials (entered manually or sent automatically) to authorize control of the controllable device and/or remote device. In this manner, a single remote device can be used by different users who enter an ID and/or password to gain access to controllable device functions, or a subset of such functions. Such ID and password may be associated with a specific protocol established for the particular remote device or user. That protocol may limit, for example, what data structure is delivered to the remote device from the controllable device (where such protocols are stored at the controllable device), and/or what function controls (function selections) are displayed at a user interface. This may be particularly useful where a parent wishes to limit TV channels that may be viewed or recorded by a young child user; give broader access privileges to a teenage user; and give full unrestricted access to an adult user. Hence, in response to a user entering a young child's ID and password, a user interface 110-1 of remote device 107-1 may not display the function control (e.g., button) for "record" as related to operation of controllable device 101-1; but such function control would appear in response to entry of an adult's ID/password information. Such customization may be likewise implemented on a remote-by-remote basis.

Protocols may be managed in a variety of ways. In one embodiment, the user of a remote device configures protocols for that remote device by entering a password and then manipulating settings. In another embodiment, a master remote may be used, or the Internet. In this manner, a parent could program a child's remote device using the parent's ID and password, then at the next session, the child's protocol would be all that can be used from the child's remote device until such time as the parent changes the protocol. In the master/child remote scenario, any type of communication path between the master and child remote may be used to program the child's remote. In another embodiment, protocols are managed using a master list of all historically or currently paired remote devices. The user identifies all the functions allowed (or allowable) to be controlled or seen by each remote device. The person with the master remote device and/or master ID/password then changes or updates permissions/limitations for each function, remote device, and/or user (e.g., TV channels or otherwise as shown and described with respect to FIG. 1C). Such changes and updates may be done at the master remote or through a display (e.g., display screens 104-1 to 104-N) at the controllable device, depending on the type of protocol and where the protocol is stored. In this manner, the actual appearance of the controls on each remote would be particular to the remote device type and capabilities of the remote device. The controllable device might send a generic set of protocols for those who do not wish to customize their remote devices and these then would be tailored to work with different remote device types. Thus, the CONFIGURATION column from table 115', for example (as will be discussed hereinafter with respect to FIG. 1B) could come preloaded with a standard configuration and then be customized by the user, if desired.

In another embodiment, the remote device, e.g., remote devices 107-1, based on a limited data structure (i.e., only an identification of functions that may be controlled and the proper associated command signal for controlling each function, and therefore a relatively small data size) sent from the controllable device via connectivity layer 105, constructs the proper command signals to send back to the controllable device for control purposes and also constructs its own look and feel for function control, based jointly on its own capabilities and on the capabilities of the remote device itself. The look and feel includes such features as placement, arrangement, and appearance of buttons, size of buttons, use of soft buttons for one or more functions, blocking of certain functions, time control so that different functions (such as sound levels, channels, etc.) are available only at particular times of the day or only under particular conditions. In some situations, the remote device will give the user a generic template of function controls and configurations and then, if desired, the user creates his or her own customized configuration.

In some situations, the user of the remote device, such as device 107-1, will download from a third party (typically an "app store") a control application that is designed to control controllable devices. The downloaded control application, typically in code format, is stored in a memory, such as memory/storage 109-1, on remote device 107-1 and runs on a processor, such as on processor 108-1, also contained on remote device 107-1. Downloading control applications from an app store is now well-known in the art and can be accomplished in any one of a number of ways, including via Internet, WiFi, or telephone network. In some situations, the control application will be pre-loaded onto the remote device by the manufacturer of the remote device. The user, from time to time, may add features or otherwise upgrade the control application to provide additional features. In operation of one embodiment, then, the remote device receives the data structure from the controllable device to be controlled, and under a control application, either on its own or with user input, assembles the functions/signals together with the proper protocol (as shown and described with respect to FIGS. 1B and 1C) such that the functions of the controllable device may be controlled from the remote device.

FIG. 1B shows an embodiment 10b of a portion of memory/storage 109-1 of remote device 107-1 that has been "programmed" with data structures of two controllable devices: controllable device 101-1 (memory portion 115 having table 115') and controllable device 101-2 (memory portion 116 having table 116'). The data structures were delivered to remote device 107-1 through connectivity layer 105. In this embodiment, controllable device 101-1 is a TV, controllable device 101-2 is a DVR, and remote device 107-1 is a smartphone. Although discussed in this embodiment as controlling only two controllable devices, a remote device configured according to the present disclosure could control additional controllable devices, to the extent such controllable devices are compatible with the remote device. The data structures (similar to tables stored in memory portions 115 and 116) for the additional controllable devices would likewise be stored in memory/storage 109-1 of remote device 107-1. When a remote device controls multiple controllable devices, a user will typically be presented with an option, via a user interface, such as user interface 110-1 (e.g., screen, speaker, and/or other sensor) to select (e.g., by touch, voice, and/or motion) the controllable device to be controlled. Alternatively, if only one controllable device is within detectable signal range of the remote device, the remote device may automatically default to presenting the user with function controls at the user interface related to the detected controllable device. In another embodiment, the user's ID and/or password may dictate what controllable devices a user may "see" and/or select for controlling, and thus, the functions presented.

In FIG. 1B, FUNCTION columns 111-1 and 111-2 and SIGNAL columns 112-1 and 112-2 contain the data structures delivered from their respective controllable devices 101-1 and 101-2. In the embodiment shown, the data structure in table 115' identifies a plurality of exemplary functions or commands (e.g., on-off, menu, volume, channel, input) associated with a plurality of exemplary command signals (e.g., XY1, XY2, XX1, ZZZ, XY3) that when sent from remote device 107-1 to controllable device 101-1, the function/command is carried out. Similarly, the data structure in table 116' identifies a plurality of exemplary functions or commands (e.g., on-off, volume, start, stop, fast forward ("FF"), fast rewind, pause, and record) associated with a plurality of exemplary command signals (e.g., XX3, XY5, AB1, AB2, AB3, AB4, AB5, XY6) that when sent from remote device 107-2 to controllable device 101-2, the function/command is carried out.

For example, from smartphone (remote device 107-1), a user may enter a command, e.g., turn TV on, by pressing a right side button of the function controls presented via user-interface 110-1. This command will be converted to a command signal. Based on the data structure of the controllable device, the proper command signal for "on" is known to be XY1. Command signal XY1 is therefore sent to the TV (controllable device 101-1) causing the TV to turn on. In an another example, the user may enter at the same smartphone (remote device 107-1) a command to display a menu of options or programs by pressing a center button of the function controls presented via user-interface 110-1. The entered command is translated into command signal, XY2, which is recognizable by the controllable device and then sent to the controllable device, which responds by displaying the menu via display screen 104-1. In another example, from the same smartphone (remote device 107-1), a user is presented (automatically or by manual selection) at user interface 110-1 a view of function controls for DVR (controllable device 101-2) rather than the TV (controllable device 101-1). The user may send a command to turn the DVR "off" by using the function control on the right side of user interface 110-1. This command is translated into the proper command signal, which is then communicated via connectivity layer 105 to the DVR. The DVR responds by turning off.

Command signals (e.g., SIGNAL columns 112-1 and 112-2) for implementing a change in the state of a controllable device's function can be any type of signal required for control purposes, typically a frequency set or a coded IR signal generated in the well-known manner by, for example, remote device 107-1, such as are discussed in U.S. Pat. No. 4,623,887, entitled "Reconfigurable Remote Control," hereby incorporated herein by reference. Alternatively, the data structure can be a new or proprietary structure known only to a specific controllable device or to a family of controllable devices. In some situations this signal may be a Bluetooth signal or any other type of signal desired. In the embodiment shown, the notation used in SIGNAL columns 112-1 and 112-2 denote the type of signal as well as the code or code sequence of the signal. Further, the functions listed in FUNCTION columns 111-1 and 111-2 are merely representative functions, and are not limited to those shown. It should be understood by those skilled in the art that any function or combination of functions could be used.

Still referring to FIG. 1B, STATUS columns 113-1 and 113-2 and CONFIGURATION columns 114-1 and 114-2, are protocol columns and contain information populated by a template and/or by the user. Protocols may originate in whole or in part from a number of sources, including controllable devices 101-1 and 101-2, remote device 101-1, master remote device (such as shown and described in FIG. 1C), or from various other data sources. In the embodiment shown, protocols are configurations specific to a particular remote device, and define the appearance, arrangement, and/or assignment of function controls (e.g., left, center, right, button, up, down, button, arrow, one-click, two-click, key word) for a specific function of a controllable device, and an associated status (e.g., on or off). For example, in the embodiment shown, the on/off function is enabled, i.e., "on," and may be manipulated using the button on the right side of user interface 110-1. It should be understood by those skilled in the art that any number of rows and columns can be used to store specialized information, preferences, associations, and/or restrictions.

Note that the configuration for each function could further include a code or other identification marker related to the operation of that function control. By doing this, anytime that code or marker appeared, the remote would know to use the same user display symbol across all controllable devices being controlled. Using the fast forward signal as an example, a special FF code can be established that is associated with FF in all controllable devices. Thus, regardless of what controllable device the remote device is currently controlling, the FF display (which can be the user's preference) will be the same. In this manner, the control application will be able to put the same FF display at the same location and/or format regardless of what actual device is being controlled at the time for a consistent user interface across multiple controllable devices.

Further, protocols applied in any particular session between a remote device and controllable device may be based on the user ID and/or password entered at the remote device 101-1, or other selection of a user (e.g., selection of a controllable device to control). Further, in the embodiment shown in FIG. 1B, the protocol and its association with a received data structure is stored at remote device 101-1 in memory/storage 109-1.

Although CONFIGURATION columns 114-1 and 114-2 shown in FIG. 1B assume buttons, bars, and arrows, whether hard or programmable, that are physically pushed or touched by the user, this form of entering a command by the user need not be so limited. Any type of input from the user can be utilized. Thus, voice commands, motion commands (e.g., with the user waiving his or her finger), and/or motion commands (e.g., with the remote device itself being moved), can be used for one or more of the functions performed by the remote device, such as remote device 107-1. In this manner, the input stimuli to the remote device is independent of the command signal that is actually passed from the remote device to the controllable device, with the translation being made in the remote device as will be discussed hereinafter.

FIG. 1C shows one embodiment 10c of a portion of a data structure for controlling a controllable device, such as controllable device 101-1. In the embodiment shown, data structure tables 117 and 118 are part of memory/storage 103-1 of controllable device 101-1. The controllable device is a TV in this embodiment. In an alternate embodiment, data structure tables 117 and 118 are part of memory/storage 109-1 of remote device 107-1 (as discussed with reference to FIG. 1B above). In that alternate embodiment, data structure tables are contained in a specification ("spec") assembly control as discussed in more detail with respect to FIG. 2.

Further, in FIG. 1C, controllable device 101-1 has been paired with two remote devices; therefore each may control function of the controllable device. The paired remote devices are remote device 107-1 (named Master, table 117, associated with a parent) and 107-2 (named Child 1, table 118, associated with a young child). Although this embodiment uses a master/child relationship for tables 117 and 118, other roles and relationships between remote devices and/or users may be employed in other embodiments. In this embodiment, tables 117 and 118 each have a plurality of specific functions that may be controlled, FUNCTION columns 119-1 and 119-2, associated with a status, such as yes or no, in STATUS columns 120-1 and 120-2, and notes in RULES columns 121-1 and 121-2. In this embodiment, the child's profile (i.e., protocols established for the child) has restrictions, e.g., remote device 107-2 (table 118) will not be allowed to control various channels, such as pay-per-view, premium, or those numbered above 100. In addition, the volume is limited after 9:00 PM and the entire remote goes inactive after midnight. Of course, this is an example, and any combination of features and controls can be implemented on a remote-by-remote and/or user-by-user basis In the embodiment shown in FIG. 1C, RULES 121-1 and 121-2 were established by entering commands at master remote device 107-1. In another embodiment, such rules may be established through another connection to the controllable device, or through controls on the controllable device.

Based on such rules, the data structure delivered to a remote device may include only a subset of all possible functions. Alternatively, the full data structure (including all possible functions) may be delivered from a controllable device but restricted by a protocol residing on the controllable device or remote device. The actual data structure delivered from a controllable device to a remote device may further depend on the ID, password, or other credential associated with a data structure. Hence, the delivered data structure may vary with the credential information.

Figure 2:
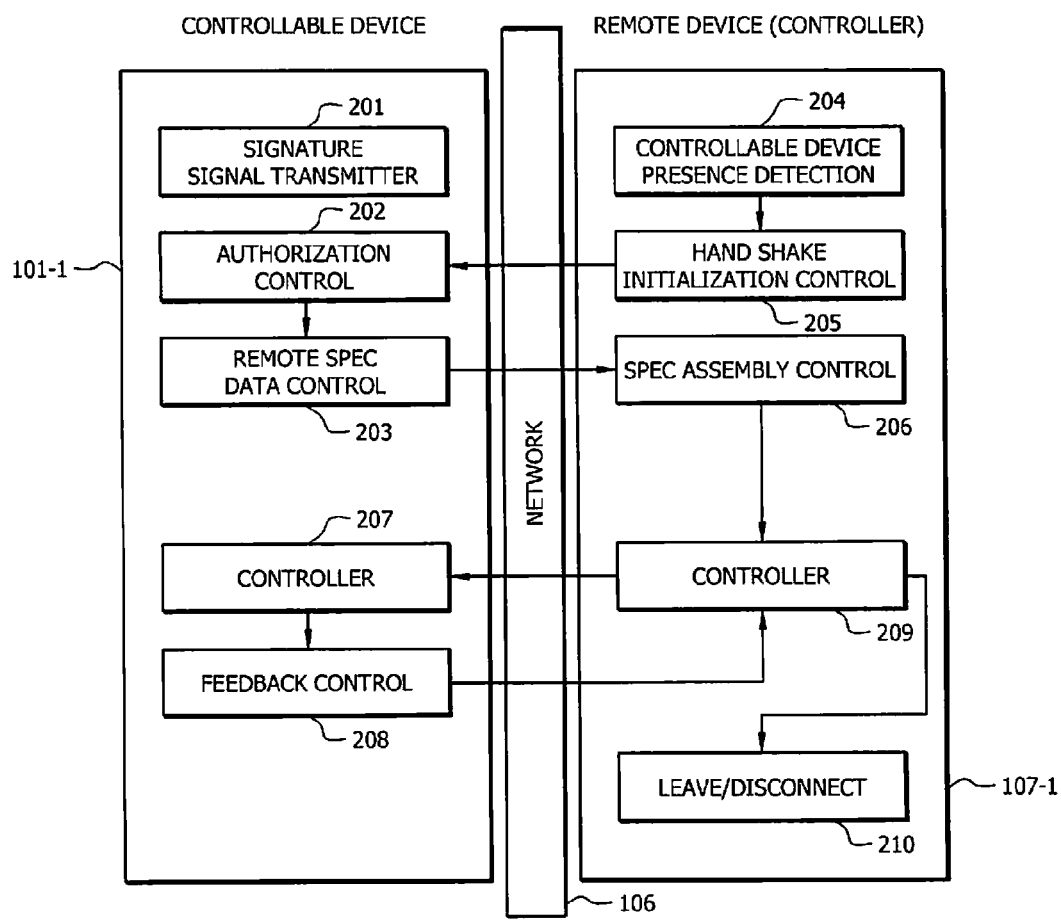
FIG. 2 shows one embodiment of the operation of a remote device working in cooperation with a controllable device in accordance with the present invention.

FIG. 2 shows one embodiment of the operation of the remote device working in cooperation with a controllable device. When a controllable device, such as controllable device 101-1, is turned on, signature signal transmitter 201 begins sending out signals that can be "sniffed" (i.e., detected) by particular devices such as remote devices. Bluetooth or any protocol can be used for this purpose and in this example, network 106 is used. Any compatible remote device in sufficient proximity of device 101-1 (or in the vicinity of network 106 or other connectivity layer 105) will, using its internal controllable device presence detector, such as controllable device presence detector 204, begin a handshaking (HS) process between handshake initialization control 205 in remote device 107-1 and authorization control 202 in controllable device 101-1. If remote device 107-1 has not already been paired with this particular controllable device 101-1, and if the devices are compatible, remote spec data control 203 sends a data structure, for example the information used to populate the FUNCTION and SIGNAL columns of table 115' as shown in FIG. 1B, to spec assembly control 206 for subsequent use by controller 209. Spec assembly control 206 aides in building the table shown at table 115' and in some cases (as noted above) table 117.

Once a pairing has been authorized (via authorization control 202, handshake initialization control 205), controller 209, working from data contained in the tables located in spec assembly control 206 responds to a human "press" of a displayed function control by sending the proper signals (as obtained from table 115') to controller 207 in the paired controllable device 101-1. These command signals are sent by IR, Bluetooth, or in any other manner, over network 106. Controller 207 handles any received command signal from any of the paired remote devices. In some situations, feedback control 208 sends feedback information to remote device 107-1. This feedback information can be any type of information desired. For example, the channel number and program information can be communicated to remote device 107-1, along with the name of the controllable device 101-1. Other instructions can also be sent to remote device 107-1 to assist in controlling controllable device 101-1. This feature can be helpful, for example, when the controllable device does not have a display screen, or is not within visible range of the user operating remote device 107-1. The feedback can be simply an acknowledgment of the received command signal.

The identification and authorization process can be any well-known process and, if desired, actual user-entered ID, password, or other credential may be required. Any unique ID or credential that the remote device (controller or controlling device) might have can be used. Further, authorization procedures may be performed at both a controllable device and a remote device. To further facilitate a more secure environment (e.g., system 10a of FIG. 1), it might be helpful to re-deliver (refresh) data structures (signal specifications/instructions) upon the happening of an event, even if the remote device and the controllable device have already been paired successfully historically or currently. For example, upon a subsequent pairing of the remote device to the controllable device, upon the lapse of a pre-defined period of time (e.g., once every half-hour, hour, week, or year), upon change in state of the controllable device or remote device (e.g., turned off or on), upon a change in protocols, rules, or functions of the controllable device, or upon determining that a command signal received is not permitted based on credential information, an updated data structure may be sent to the remote device. Thus, if a remote was hacked, and protocols changed without the owner's permission, i.e., giving access to an restricted TV channel or DVR function, the data structure, and accompanying limitations/restrictions, would be renewed upon the happening of an event as described above, e.g., a new paired session. The new data structure and rules (if any) would be applied to the remote device in the new session, overriding any previously delivered data structure and/or protocol that is outdated or unauthorized.

If an ID, password, or other credential is required, rules such as those contained in table 117 of FIG. 117 of FIG. 1C, would most likely be stored on the controllable device and not in the remote device to minimize any effect of the remote device being hacked (e.g., unauthorized changes to protocols/rules). Otherwise, a delivered data structure may be stored, at least temporarily, at the remote device and available from time to time so that a user may control specific functions of a controllable device without requiring further delivery of the previously stored data structure.

Another security feature may use other credential information to verify one or more of the remote devices, such as a MAC address and/or any other network-type identification. In some situations, new remote devices may not be added without express permission from a particular "master" remote device. In some embodiments, when the session is over, for example, when the remote leaves the vicinity of the controllable device, or when the controllable device is turned off, leave/disconnect 210 can sever the temporary pairing. In such an event, the process of authorizing a re-pairing will occur when a new session begins, and preferably a new set of data structures (signal specifications/instructions) will be exchanged between the controllable device and the remote device.

Figure 3:
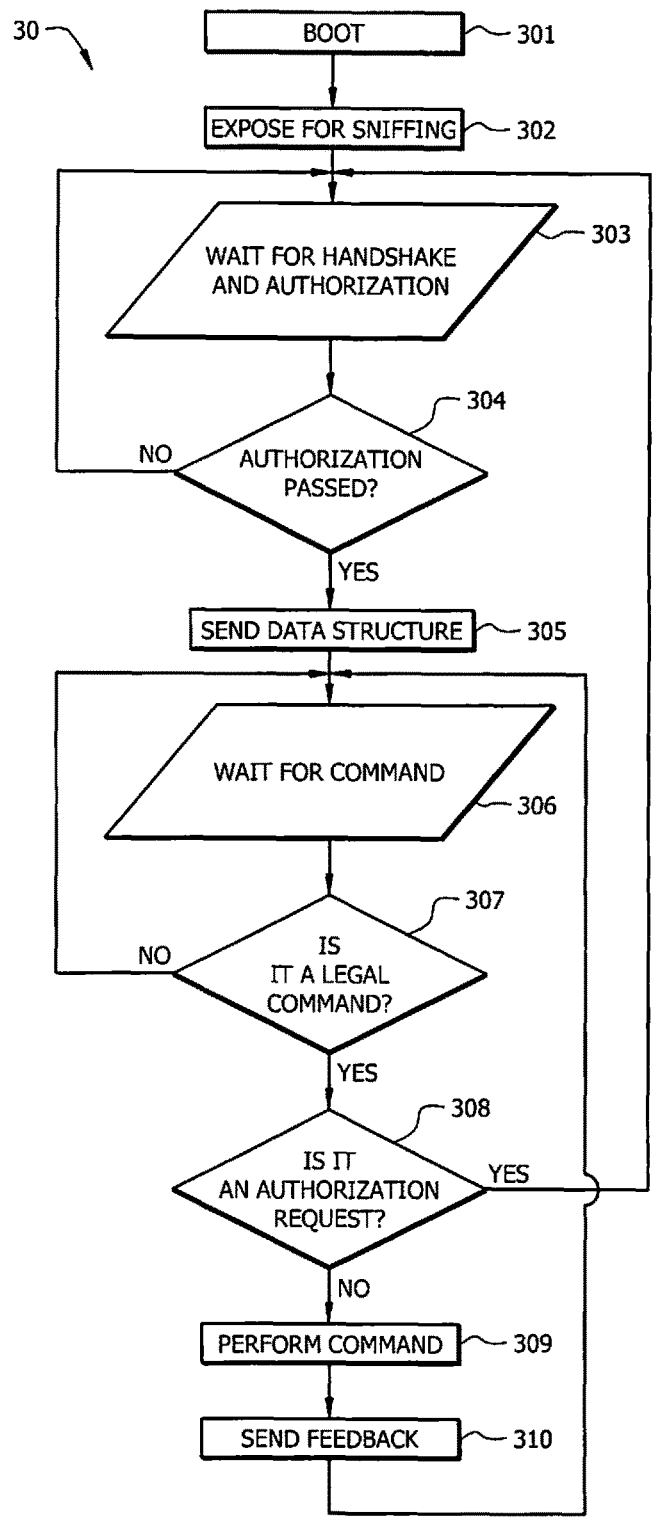
FIG. 3 shows one embodiment of a typical life cycle of a controllable device in accordance with the present invention.

FIG. 3 shows one example 30 of a typical life cycle of the controllable device. Process 30 begins with boot process 301 which turns on the system and causes process 302 to expose a signal for discovery by a remote device. In the system shown, the remote device will search for the controllable device and initiate communication. In another embodiment, the controllable device will seek out remote devices detected. Returning to example 30, the system then waits under control of process 303 for a remote to "sniff" its transmitted signal and to respond with a handshake offer. When such an offer arrives, process 304 either accepts the pairing or rejects it. If accepted, process 304 causes process 305 to send the proper data structure to the remote device. At this stage, the initialization is finished and process 306 causes the controllable device to wait for a command signal to be received from any of its paired remote devices.

When process 306 detects receipt of a command signal or other event from a remote device, that command signal is checked by process 307 to determine if it is a "legal" (i.e., permitted or valid) command from an authorized remote device or if it is an authorization request. If the command is an authorization request, then process 308 diverts the request to process 303.

If the received signal corresponds to a proper command then process 309 performs the command delivered by the command signal and if desired, process 310 furnishes feedback to the remote device. The process then returns to process 306 to await an additional command signal or other event.

Figure 4:
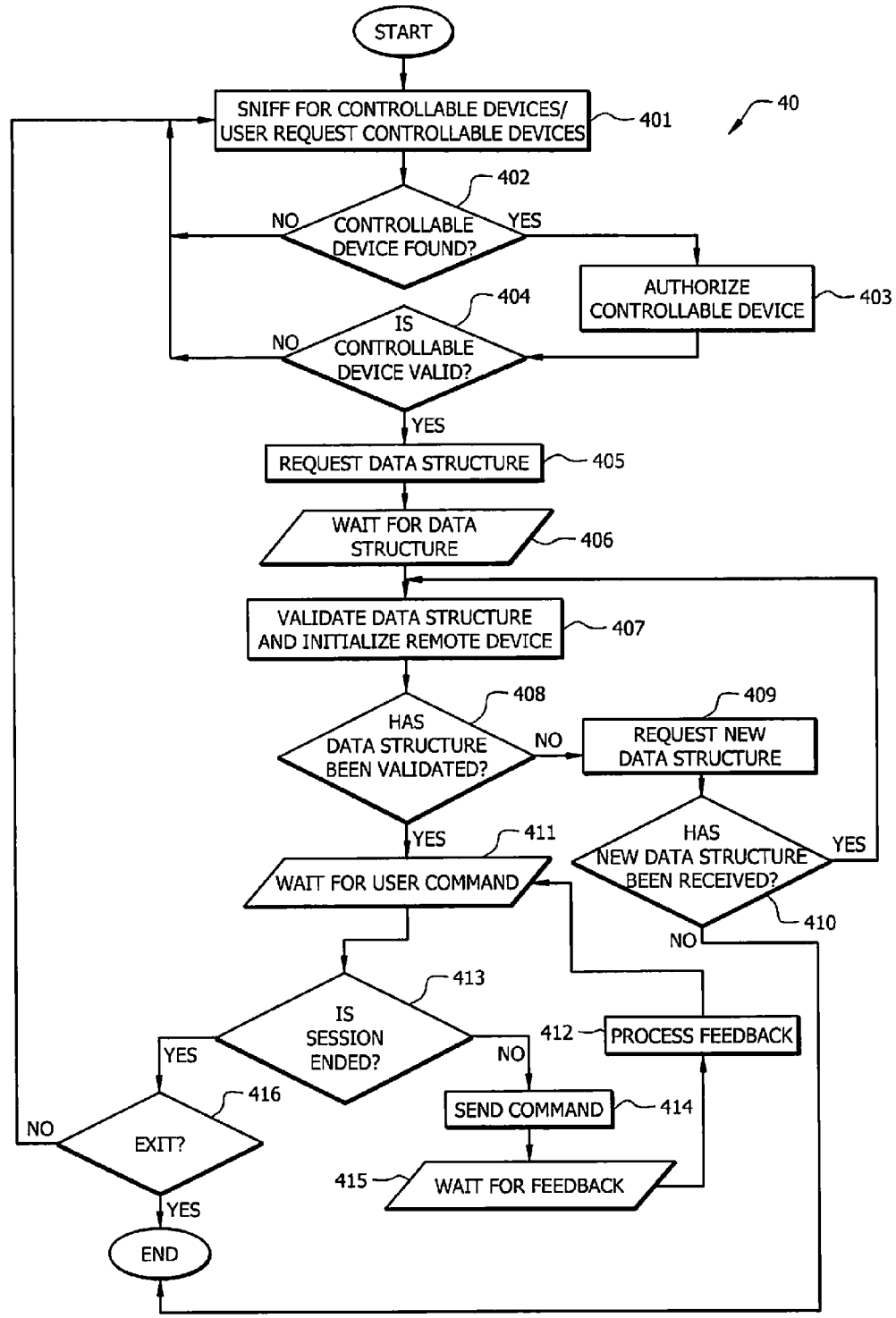
FIG. 4 shows one embodiment of a typical life cycle of a remote device in accordance with the present invention.

FIG. 4 shows a typical life cycle 40 of a remote device. Process 401 sniffs for controllable devices in proximity to the remote device. Process 402, upon finding a possible controllable device, enables process 403 to begin an authorization process as discussed above with reference to FIGS. 2 and 3. If process 404 determines that the found controllable device is indeed a proper one for control (and assuming the controllable device likewise finds the remote device to be proper) then process 405 requests a data structure from the controllable device in order to know which signals to send to the controllable device for proper control. Process 406 waits for the requested data structure.

Process 407, upon receipt of the controllable devices' data structure, validates the received data structure to be certain the remote device can properly operate the controllable device. If process 408 determines that the received data structure is not proper or not one it can handle, then optionally a new data structure can be requested under control of process 409. When process 410 determines that a new data structure has been received process 407 is reentered. If no new data structure is received, life cycle 40 ends and the remote is non-functional with respect to this particular controllable device. Note that while the process discussed herein assumes a standard set of data structures (signal specifications/instructions) for controlling the controllable device, perhaps adjusted for the type of remote device that is requesting the data structures, it should be understood that the remote device could request certain formats and/or formats for certain functions. Thus, the "standard" communication of data structures from the controllable device need not cover all possible functional controls if the remote device is not capable of using all such controls. In operation, the standard package can be augmented function-by-function, or in function packages, using codes that apply across product-lines to identify function sets the remote device is capable of handling.

Once process 408 determines that a received data structure is acceptable, then process 411 waits for an input command from a user of the remote device. While process 411 is waiting, if process 413 determines the session has ended, process 416 determines if the remote device is going to turn off or alternatively, resume sniffing for new controllable devices.

When a command is received from a user while the session remains active, then process 414 sends the associated command signal to the paired controllable device using the proper signal set as obtained from its memory (e.g., from SIGNAL column 112-1 as discussed above with respect to FIG. 1B). If feedback has been received by process 415, it is controlled by process 412 and the appropriate action taken (such as shown and described with respect to FIG. 2 and feedback control 208).

Figure 5:
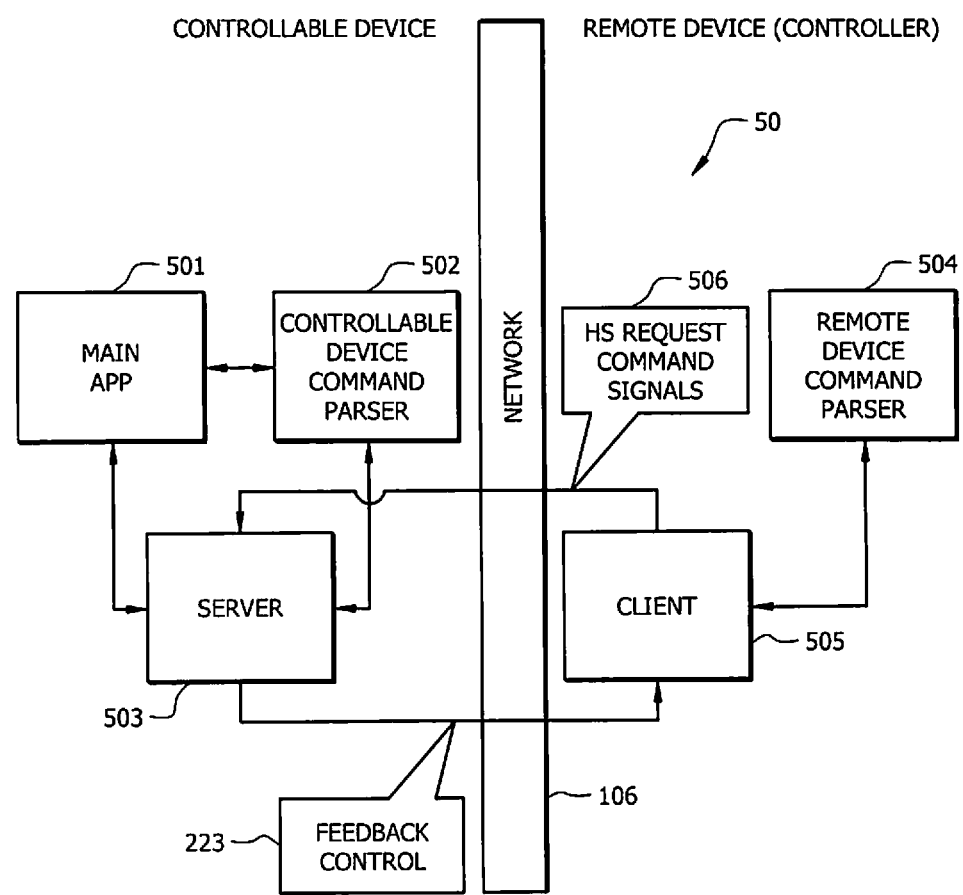
FIG. 5 shows one embodiment of data flow in the system configured according to the present invention.

FIG. 5 shows one embodiment 50 of data flow in the system according to the present disclosure. Shown are server 503 and client 505. Client 505 runs in the remote device (controller), such as remote devices 101-1 to 101-N of FIG. 1, while server 503 runs in the controllable device, such as controllable devices 107-1 to 107-N of FIG. 1.

Server 503 sends the data structures and feedback (e.g., acknowledgment of receipt of command signal) to client 505. The data structure can be any desired function, signal, and/or other structure as discussed above with reference to FIGS. 1B and 1C. In a typical system, the data structure will be limited, that is, it will include only the identity of the functions that may be controlled, and the associated command signal (or other like instruction) for remotely controlling the function. In other embodiments, the exchanged data structure may be more robust and include protocols, rules, or other information useful to carrying out remote control of the controllable device.

Client 505 sends the handshake (HS) request and command signals 506 to controllable device server 503. Client 505 sends data structures received from server 503 to command parser 504. In one embodiment, command parser 504 is a control application downloaded from an app store or received from some other source. Command parser 504 also contains the graphical layer of the control application that accepts the data and represents it to the user in a manner that is user friendly at a user interface, e.g., 110-1. The same graphical layer of the control application parses the user initiated input (such as touching the displayed volume button) and sends such command signals (event information) to client 505 for delivery to server 503. As discussed above with reference to FIG. 1A, the input could take any form, from verbal to motion and can differ for different controllable devices. Thus, shaking the remote device during a live sports event might cause the motion on the screen to slow down whereas shaking the remote while watching a movie on a Blu-ray player might pause the movie. Since the translation (conversion) of the user input (into command signals) is made under control of command parser 504 and the control application currently resident on the remote device, the controllable device remains neutral to how such input is received, since the controllable device acts only on signals sent from the remote device. Such command signals have already been put into the form demanded by the controllable device and as previously communicated to the remote device as part of the data structure.

On the controlled side, when server 503 receives a new command signal, it sends that command to command parser 502 for analysis. Command parser 502 drives main application 501 (e.g., an application within a set-top box) within the controllable device. Main app (i.e., main application) 501 handles the command as received from the remote device, and, if appropriate, sends feedback to server 503 for subsequent delivery to client 505. The control application, as contained in the remote device commands parser 504 then takes action based on the feedback. This action can take any number of forms, from displaying information to the user via the user interface (see, e.g., user interface 110-1 of FIG. 1), to changing the code structure, or to initiating additional response actions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method of controlling a controllable device remotely using one or more remote devices, the method comprising:

storing at the controllable device an association between a data structure stored on the controllable device and credential information of the one or more remote devices, wherein the data structure comprises a table listing (1) a plurality of functions performed by the controllable device and (2) a plurality of instructions which causes the controllable device to perform the plurality of functions;

transmitting availability of the controllable device for control by the one or more remote devices;

receiving, in response to the transmitting, a request for authorization to control the controllable device from a first remote device of the one or more remote devices, wherein the request includes the credential information of the first remote device;

accepting the request if the credential information of the first remote device is recognized by the controllable device; and transmitting from the controllable device to the first remote device a data structure associated with the first remote device.

2. The method of claim 1, wherein the credential information comprises a MAC address.

3. The method of claim 1, wherein the credential information comprises a password entered at the one remote device.

4. The method of claim 1, wherein the data structure transmitted from the controllable device to the first remote device varies with the credential information of the first remote device.

5. The method of claim 1, further comprising:
accepting from the first remote device a command signal to perform one of the functions;
determining whether the command signal is permitted based on the credential information of the first remote device; and
delivering to the first remote device a new data structure to override the previously delivered data structure upon determining that the command signal is not permitted for the credential information of the first remote device.

6. The method of claim 5, further comprising:
storing, at the controllable device, protocols for the plurality of functions performed by the controllable device,
wherein the protocols are associated with the credential information of the first remote device; and
allowing a user of the first remote device to selectively configure the protocols.

7. The method of claim 6, wherein the protocols define which of the plurality of functions performed by the controllable device and which of the command signals are included in the delivered data structure.

8. An apparatus for controlling a controllable device using one or more remote devices, the apparatus comprising:
means for storing at the controllable device an association between a data structure stored on the controllable device and credential information of one or more remote devices,
wherein the data structure comprises a table listing (1) a plurality of functions performed by the controllable device and (2) a plurality of instructions to perform the plurality of functions;
means for transmitting availability of the controllable device for control by the one or more remote devices;
means for receiving, in response to the transmitting, a request for authorization to control the controllable device from a first remote device of the one or more remote devices,
wherein the request includes the credential information of the first remote device;
authorizing means for accepting the request if the credential information of the first remote device is recognized by the controllable device; and
means for transmitting a data structure associated with the first remote device to the first remote device.

9. The apparatus of claim 8, wherein the credential information comprises a MAC address.

10. The apparatus of claim 8, wherein the credential information comprises a password entered at the one remote device.

11. The apparatus of claim 8, wherein the data structure transmitted from the controllable device to the first remote device varies with the credential information of the first remote device.

12. The apparatus of claim 8, further comprising:
means for accepting from the first remote device a command signal to perform one of the plurality of functions;
means for determining whether the command signal is permitted based on the credential information of the first remote device; and
means for delivering to the first remote device a new data structure to override the previously delivered data structure upon determining that the command signal is not permitted for the credential information of the first remote device.

13. The apparatus of claim 12, further comprising:
means for storing protocols for the plurality of functions performed by the controllable device,
wherein the protocols are associated with the credential information of the first remote device;
means for allowing a user of the first remote device to selectively configure the protocols.

14. The apparatus of claim 13, wherein the protocols define which of the plurality of functions performed by the controllable device and which of the command signals are included in the delivered data structure.

15. An application program product for controlling a controllable device remotely using one or more remote devices, the application program product comprising non-transitory computer readable medium having program code recorded thereon, the program code configured to perform the steps of:
storing an association between a data structure stored on the controllable device and credential information of the one or more remote devices,
wherein the data structure comprises a table listing (1) a plurality of functions performed by the controllable device and (2) a plurality of instructions to perform the plurality of functions;
transmitting availability of the controllable device for control by the one or more remote devices;
receiving, in response to the transmitting, a request for authorization to control the controllable device from a first remote device of the one or more remote devices,
wherein the request includes the credential information of the first remote device;
accepting the request if the credential information of the first remote device is recognized by the controllable device; and transmitting from the controllable device to the first remote device a data structure associated with the first remote device.

16. The application program product of claim 15, wherein the credential information comprises a MAC address.

17. The application program product of claim 15, wherein the credential information comprises a password entered at the one remote device.

18. The application program product of claim 15, wherein the data structure transmitted from the controllable device to the first remote device varies with the credential information of the first remote device.

19. The application program product of claim 15, wherein the program code is configured to perform the steps of:
   accepting from the first remote device a command signal to perform one of the plurality of functions;
   determining whether the command signal is permitted based on the credential information of the first remote devices; and
   delivering to the first remote device a new data structure to override the previously delivered data structure upon determining that the command signal is not permitted for the credential information of the first remote device.

20. The application program product of claim 19, wherein the program code is configured to perform the steps of:
   storing protocols for the plurality of functions performed by the controllable device,
   wherein the protocols are associated with the credential information of the first remote device; and
   allowing a user of the first remote device to selectively configure the protocols.

21. The application program product of claim 20, wherein the protocols define which of the plurality of functions performed by the controllable device and which of the command signals are included in the delivered data structure.

* * * * *